(12) United States Patent
Li (10) Patent No.: US 12,025,259 B1
(45) Date of Patent: Jul. 2, 2024

(54) MULTIFUNCTIONAL CLAMPING DEVICE

(71) Applicant: Shenzhen Leaderment Technology Co.,Ltd., Shenzhen (CN)

(72) Inventor: Chunbin Li, Shenzhen (CN)

( * ) Notice: Subject to any disclaimer, the term of this patent is extended or adjusted under 35 U.S.C. 154(b) by 0 days.

(21) Appl. No.: 18/405,981

(22) Filed: Jan. 5, 2024

(30) Foreign Application Priority Data

Dec. 22, 2023 (CN) .......................... 202323539298.7

(51) Int. Cl.
*F16M 11/04* (2006.01)
*F16M 11/06* (2006.01)

(52) U.S. Cl.
CPC .......... *F16M 11/041* (2013.01); *F16M 11/06* (2013.01)

(58) Field of Classification Search
CPC .. F16M 11/041; F16M 11/105; F16M 11/125; H04M 1/04; B60R 11/0241
See application file for complete search history.

(56) References Cited

U.S. PATENT DOCUMENTS

| | | | | |
|---|---|---|---|---|
| 5,197,817 | A * | 3/1993 | Wood .................. | F16C 11/10 403/324 |
| 8,967,561 | B2 * | 3/2015 | Cheng ................ | F16M 11/2014 248/176.1 |
| 9,416,914 | B1 * | 8/2016 | Fan .................... | F16M 11/2021 |
| 10,272,847 | B1 * | 4/2019 | Fan .................... | B60R 11/0241 |
| 10,288,987 | B2 * | 5/2019 | Olmos-Calderon ........ G03B 17/566 |
| 10,569,717 | B2 * | 2/2020 | Peters .................... | F16M 11/08 |
| 10,702,067 | B2 * | 7/2020 | Acevedo ............... | F16M 11/14 |
| 10,932,601 | B1 * | 3/2021 | Fan ......................... | F16M 13/02 |
| 11,112,216 | B1 * | 9/2021 | Fan ......................... | F41G 11/00 |
| 11,473,601 | B2 * | 10/2022 | Fan .................... | F16M 11/2064 |
| 11,852,289 | B2 * | 12/2023 | Barilotti ............. | F16M 11/2021 |
| 2014/0103181 | A1 * | 4/2014 | Duerigen ............ | F16M 11/041 248/289.11 |
| 2021/0109426 | A1 * | 4/2021 | Bei ...................... | G03B 17/566 |
| 2021/0195071 | A1 | 6/2021 | Jian | |
| 2021/0392218 | A1 * | 12/2021 | Wu ......................... | H04M 1/04 |
| 2022/0201110 | A1 | 6/2022 | Shan et al. | |
| 2022/0333736 | A1 | 10/2022 | Zou et al. | |
| 2023/0025681 | A1 | 1/2023 | Liu | |
| 2023/0122895 | A1 * | 4/2023 | Alesi .................... | F16M 13/022 248/346.01 |

\* cited by examiner

*Primary Examiner* — Bradley Duckworth (57) ABSTRACT

The present utility model discloses a multifunctional clamping device, comprising a clamping assembly, a connecting member and a base, wherein the clamping assembly is rotatably connected to one end of the connecting member, the clamping assembly is provided with a first clamping opening used to clamp an object, one side that is of the connecting member and that is far away from the clamping assembly is provided with a second clamping opening, the other end of the connecting member is rotatably connected to the base through a fixing assembly, the fixing assembly comprises a fixing member, the fixing member is provided with a first toothed disc and a second toothed disc, and the connecting member and the base are respectively provided with first concave teeth and second concave teeth corresponding to the first toothed disc and the second toothed disc.

9 Claims, 5 Drawing Sheets

MULTIFUNCTIONAL CLAMPING DEVICE

CROSS-REFERENCE TO RELATED APPLICATION

The present application claims priority to Chinese Patent Application No. 202323539298.7, filed on Dec. 22, 2023, the entire contents of which are incorporated herein by reference.

TECHNICAL FIELD

The present utility model relates to the technical field of clamps, and in particular, to a multifunctional clamping device.

BACKGROUND

A clamping device is a device for clamping an object and then controlling the object. The clamping device can clamp and release an object such as a mobile phone, a tablet computer and other electronic devices. The use of mobile phones in daily life is more and more diversified, and especially in the Internet era, the public can use the mobile phone to photograph or perform network live broadcast. As people have more and more requirements on short video photographing, the short video photographing device is very inconvenient to hold by hands, so that the clamping device is used to clamp and position the device for photographing. The clamping device can also fix the mobile phone in a tripod or other photographic accessories to meet the photographing requirements.

The current clamping device has a relatively single function, and the assembly structure of the existing clamping device has gaps and cannot be locked tightly. Consequently, when a user uses the clamping device to clamp an object, the stability is poor and shaking is prone to occur, resulting in a poor user experience.

SUMMARY

A primary objective of the present utility model is to provide a multifunctional clamping device, which aims to solve the problem of poor stability of the existing clamping device during use.

In order to achieve the above objective, the present utility model provides a multifunctional clamping device, which comprises a clamping assembly, a connecting member and a base, wherein the clamping assembly is rotatably connected to one end of the connecting member, the clamping assembly is provided with a first clamping opening used to clamp an object, one side that is of the connecting member and that is far away from the clamping assembly is provided with a second clamping opening, the other end of the connecting member is rotatably connected to the base through a fixing assembly, the fixing assembly comprises a fixing member, the fixing member is provided with a first toothed disc and a second toothed disc, and the connecting member and the base are respectively provided with first concave teeth and second concave teeth corresponding to the first toothed disc and the second toothed disc.

In one embodiment, a bottom of the connecting member is provided with two connecting arms, a top of the base is buckled between the two connecting arms, the fixing assembly further comprises a first knob and a first fastener, and the first fastener passes through the connecting arm, the base and the fixing member and is connected to the first knob.

In one embodiment, the connecting arm is provided with a limiting hole used to limit the fixing member, an annular boss is provided in the limiting hole, the fixing member abuts against the annular boss, and the first concave teeth are arranged on the annular boss.

In one embodiment, the fixing member comprises a first cylinder and a second cylinder, the first cylinder has a diameter adapted to a diameter of the limiting hole, the second cylinder has a diameter adapted to an inner diameter of the annular boss, the first cylinder abuts against the annular boss, and the first toothed disc is arranged on the first cylinder.

In one embodiment, the second toothed disc is arranged on the second cylinder, the second concave teeth are arranged on the base, and the second cylinder passes through the inside of the annular boss and is engaged with the base.

In one embodiment, the base comprises a fixed seat, a fixed plate, a rotary disc and a cold shoe seat, two ends of the fixed seat are respectively connected to the connecting member and the fixed plate, the rotary disc is arranged in the fixed seat, the cold shoe seat is arranged at a bottom of the fixed plate, and the cold shoe member passes through the fixed plate and is in threaded connection with the rotary disc.

In one embodiment, a bottom of the cold shoe seat is provided with a threaded hole used to connect to other devices.

In one embodiment, the clamping assembly comprises a second fastener, a second knob and a clamping arm, the second fastener sequentially passes through the clamping arm and the connecting member and is connected to the second knob, and an elastic element is arranged between the second knob and the connecting member.

In one embodiment, a plurality of first protrusions are arranged on an outer wall that is of the clamping arm and that is close to the connecting member, a plurality of second protrusions are arranged on an outer wall at a position that is of the connecting member and that corresponds to the first protrusion, and the first protrusion is rotatably connected to the second protrusion.

In one embodiment, a first foot pad and a second foot pad are respectively arranged at two ends of the clamping arm, a first cold shoe opening and a second cold shoe opening are respectively arranged at outer sides of the first foot pad and the second foot pad, and a plurality of expansion holes are arranged at one side that is of the connecting member and that is far away from the clamping assembly.

The present utility model has the following beneficial effects.

According to the present utility model, the first clamping opening is arranged to clamp the electronic device, the clamping assembly rotates along the connecting member, and the connecting member drives the clamping assembly to rotate along the base, so that the electronic device can be adjusted at multiple angles, and meanwhile, some expansion devices such as a lamp tube and a speaker used with the electronic device can be arranged on the second clamping opening. In addition, the first toothed disc and the second toothed disc are arranged on the fixing member connected between the connecting member and the base, and the first concave teeth and the second concave teeth are correspondingly arranged on the base and the connecting member, so that the fixing member is engaged with the connecting member and the base, the base and the connecting member are locked tightly, the stability of the clamping device is improved, the clamping device can be prevented from shaking in the using process, and the experience of a user is improved.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

DESCRIPTIONS OF REFERENCE NUMERALS

1: clamping assembly; 11: second fastener; 12: second knob; 13: clamping arm; 131: first projection; 14: elastic element; 15: first foot pad; 16: second foot pad; 17: first cold shoe opening; 18: second cold shoe opening; 19: first clamping opening; 2: connecting member; 21: limiting hole; 211: annular boss; 2111: first concave teeth; 22: second projection; 23: second clamping opening; 24: expansion hole; 25: connecting arm; 3: base; 31: second concave teeth; 32: fixed seat; 33: fixed plate; 34: rotary disc; 35: cold shoe seat; 351: threaded hole; 4: fixing assembly; 41: first knob; 42: fixing member; 421: first cylinder; 4211: first toothed disc; 422: second cylinder; 4221: second toothed disc; and 43: first fastener.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

Figure 1:
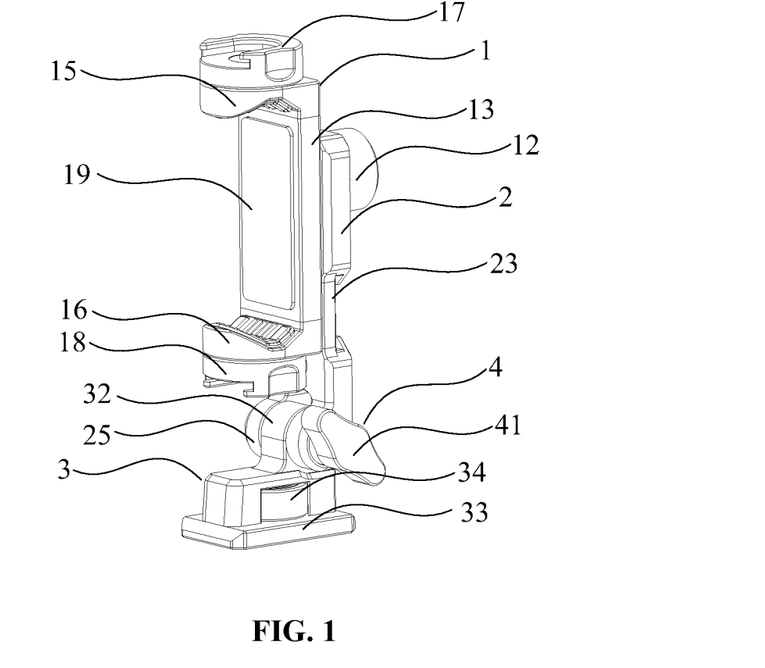
FIG. 1 is a schematic diagram of a structure of a multifunctional clamping device according to the present utility model.
Figure 2:
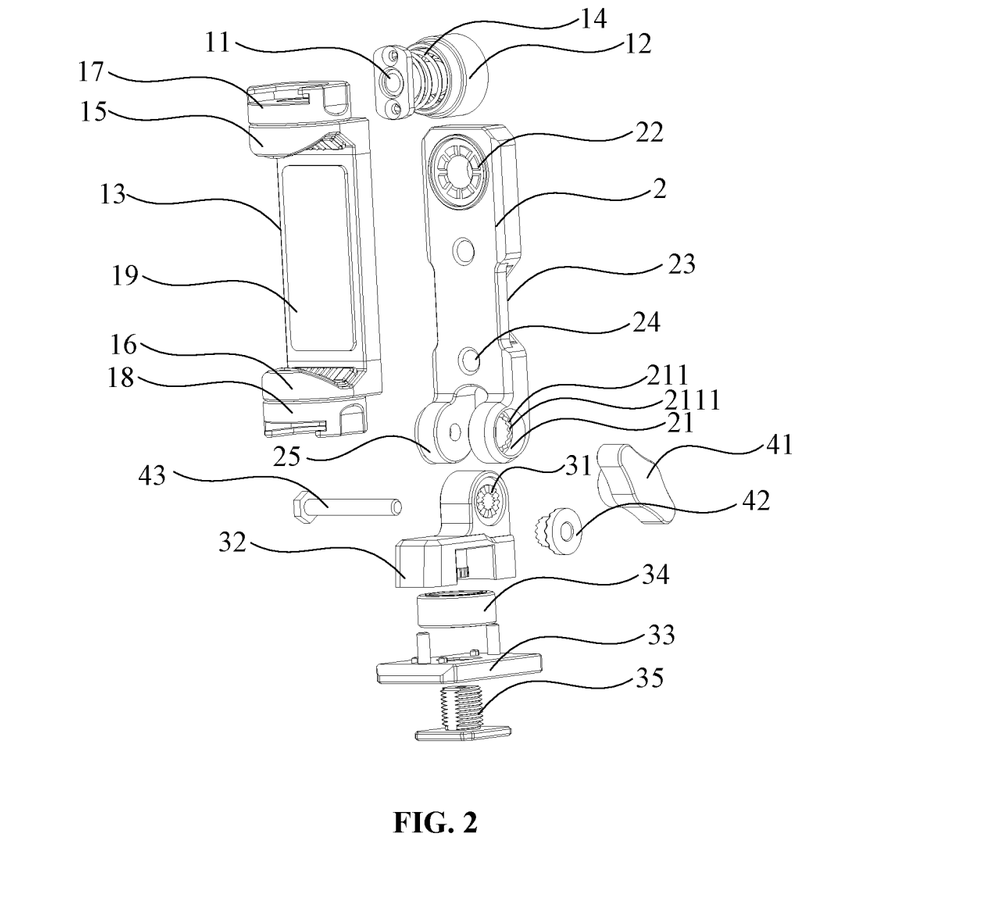
FIG. 2 is an exploded diagram of a multifunctional clamping device according to the present utility model.
Figure 4:
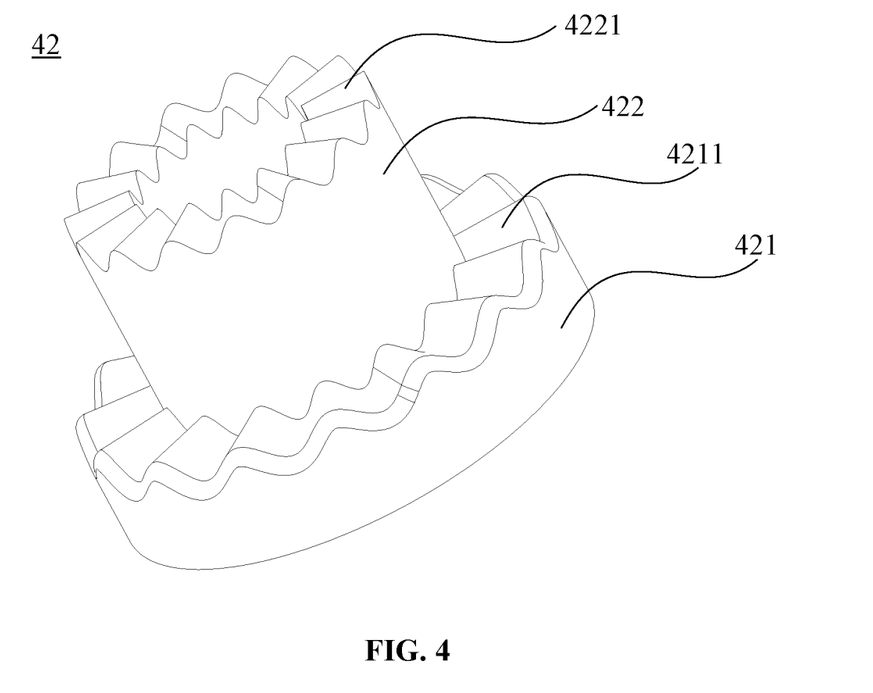
FIG. 4 is a schematic diagram of a structure of a fixing member according to the present utility model.

Referring to FIGS. 1, 2, and 4, an embodiment of the present utility model provides a multifunctional clamping device, which comprises a clamping assembly 1, a connecting member 2 and a base 3, wherein the clamping assembly 1 is rotatably connected to one end of the connecting member 2, the clamping assembly 1 is provided with a first clamping opening 19 used to clamp an object, one side that is of the connecting member 2 and that is far away from the clamping assembly 1 is provided with a second clamping opening 23, the other end of the connecting member 2 is rotatably connected to the base 3 through a fixing assembly 4, the fixing assembly 4 comprises a fixing member 42, the fixing member 42 is provided with a first toothed disc 4211 and a second toothed disc 4221, and the connecting member 2 and the base 3 are respectively provided with first concave teeth 2111 and second concave teeth 31 corresponding to the first toothed disc 4211 and the second toothed disc 4221.

According to the present utility model, the first clamping opening 19 is arranged to clamp the electronic device, the clamping assembly 1 rotates along the connecting member 2, and the connecting member 2 drives the clamping assembly 1 to rotate along the base 3, so that the electronic device can be adjusted at multiple angles, and meanwhile, some expansion devices such as a lamp tube and a speaker used with the electronic device can be arranged on the second clamping opening 23. In addition, the first toothed disc 4211 and the second toothed disc 4221 are arranged on the fixing member 42 connected between the connecting member 2 and the base 3, and the first concave teeth 2111 and the second concave teeth 31 are correspondingly arranged on the base 3 and the connecting member 2, so that the fixing member 42 is engaged with the connecting member 2 and the base 3, the base 3 and the connecting member 2 are locked tightly, the stability of the clamping device is improved, the clamping device can be prevented from shaking in the using process, and the experience of a user is improved.

Specifically, the clamping assembly 1 can rotate 360 degrees along a plane of the connecting member 2, and the connecting member 2 can drive the clamping assembly 1 to rotate 180 degrees front and back along the base 3, thereby adjusting the front and rear rotation angles to achieve multi-directional angle adjustment. In addition, the first clamping opening 19 can be used to clamp a variety of electronic devices such as a mobile phone, a tablet computer and iPads. In this embodiment, clamping a mobile phone is taken as an example.

Referring to FIGS. 1 and 2, a bottom of the connecting member is provided with two connecting arms 25, a top of the base 3 is buckled between the two connecting arms 25, the fixing assembly 4 further comprises a first knob 41 and a first fastener 43, and the first fastener 43 passes through the connecting arm 25, the base 3 and the fixing member 42 and is connected to the first knob 41. In this embodiment, the first fastener 43 may be configured as a screw, through a threaded connection between the first fastener 43 and the first knob, the connecting member 2, the base 3 and the fixing member 42 are connected together; and by locking and unlocking the first fastener 43 and the first knob 41, the rotational connection between the connecting member 2 and the base 3 can be achieved.

Meanwhile, in order to further improve the stability of the connection between the connecting member 2 and the base 3, referring to FIG. 2, the connecting member 2 is provided with a limiting hole 21 used to limit the fixing member 42, an annular boss 211 is provided in the limiting hole 21, the fixing member 42 abuts against the annular boss 211, and the first concave teeth 2111 are arranged on the annular boss 211. The fixing member 42 abuts against and is far away from the annular boss 211 under the rotation action of the first knob 41, when the first knob 41 is turned clockwise, the first knob 41 gradually enters the limiting hole 21 and pushes the fixing member 42 to move towards the annular boss 211 until the fixing member 42 abuts against the annular boss 211, and in this case, the first toothed disc 4211 is just engaged with the first concave teeth 2111 to lock the fixing member 42 and the connecting member 2.

The fixing member 42 is configured as a structure made of polyoxymethylene (POM). The polyoxymethylene, referred to as acetal resin, polyoxymethylene and polyacetal, is a thermoplastic crystalline polymer and is known as polyformaldehyde. The fixing member 42 made of POM material has the characteristics of strong wear resistance, high strength, good stability, easy processing, and good chemical corrosion resistance.

Specifically, referring to FIGS. 2 and 4, the fixing member 42 comprises a first cylinder 421 and a second cylinder 422, the first cylinder 421 has a diameter adapted to a diameter of the limiting hole 21, the second cylinder 422 has a diameter adapted to an inner diameter of the annular boss 211, the first cylinder 421 abuts against the annular boss 211, and the first toothed disc 4211 is arranged on the first cylinder 421. The fixing member 42 is configured as a concentric cylinder, the centers of circles of the first cylinder 421 and the second cylinder 422 are located at the same position, and when the annular boss 211 abuts against the first cylinder 421, the first toothed disc 4211 is just engaged with the first concave teeth 2111.

Further, referring to FIGS. 2 and 4, the second toothed disc 4221 is arranged on the second cylinder 422, the second concave teeth 31 are arranged on the base 3, and the second cylinder 422 passes through the inside of the annular boss 211 and is engaged with the base 3. When the first knob is rotated clockwise and locked, the first toothed disc 4211 and the first concave teeth 2111 are meshed and locked with each other, and the second toothed disc 4221 and the second concave teeth 31 are also meshed and locked with each other, so that the connecting member 2 and the base 3 are locked, the stability of the clamping device is improved, and the situation that the clamping device does not shake in the use process is ensured. If the front and rear rotation angle of the connecting member 2 needs to be adjusted, the first knob 41 only needs to be rotated counterclockwise, so that the fixing member 42 is far away from the annular boss 211, the front and rear angles of the connecting member 2 can be rotated randomly, and the operation is simple and convenient.

Referring to FIGS. 1 and 2, the base 3 comprises a fixed seat 32, a fixed plate 33, a rotary disc 34 and a cold shoe seat 35, two ends of the fixed seat 32 are respectively connected to the connecting member 2 and the fixed plate 33, the rotary disc 34 is arranged in the fixed seat 32, the cold shoe seat 35 is arranged at a bottom of the fixed plate 33, and the cold shoe member passes through the fixed plate 33 and is in threaded connection with the rotary disc 34.

Specifically, a silica gel gasket is further arranged between the rotary disc 34 and an inner wall of the fixed seat 32, so that friction between the rotary disc 34 and the inner wall of the fixed seat 32 during rotation can be relieved. In this embodiment, part of the rotary disc 34 is exposed out of the fixed seat 32, and when the rotary disc 34 rotates in a counterclockwise direction, the cold shoe seat 35 mounted at a bottom of the fixed plate 33 rotates out through a thread, and can be connected to other photographing devices such as a tripod and a camera hot shoe rack; and when the rotary disc 34 rotates clockwise, the cold shoe seat 35 will retract to the bottom of the fixed plate 33 until hidden inside the fixed plate 33, and this hidden design here makes the whole clamping device shorter in length and gives better experience to the user. Moreover, in addition to mounting the cold shoe seat 35 to other photographing devices, referring to FIG. 5, the bottom of the cold shoe base 35 is provided with a threaded hole 351 for connecting to other devices, so that the cold shoe seat can be mounted to a device having a threaded joint, and the expandability is further improved.

It should be noted here that a difference between a hot shoe and a cold shoe is whether there are contacts and whether external exchanges can be possible. The existence of the contact means whether a contact exists at a position where a camera light is inserted into the cold shoe of the camera; whether external exchange is possible refers to whether conduction of electricity is possible; and the cold shoe is provided for a lamp pin to be inserted, but does not allow for information exchange and signal transmission. Some plastic bases 3 for flashes, for example, are cold shoes. The hot shoe is provided for a lamp pin to be inserted, and allows the flash to transmit signals and communicate with external devices through the hot shoe.

Referring to FIG. 2, the clamping assembly 1 comprises a second fastener 11, a second knob 12 and a clamping arm 13, the second fastener 11 sequentially passes through the clamping arm 13 and the connecting member 2 and is connected to the second knob 12, and an elastic element 14 is arranged between the second knob 12 and the connecting member 2. In this embodiment, the second fastener 11 may be configured as a screw, an opening on the clamping arm 13 for clamping the object functions as the first clamping opening 19, when the clamping assembly 1 rotates to a proper position, the clamping arm 13 and the connecting member 2 are locked by the second fastener 11 and the second knob 12, and when the second knob 12 rotates clockwise, the elastic element 14 is compressed, so as to lock the clamping arm 13, so that the clamping arm 13 does not rotate any more, and the stability of the clamping device is further improved.

Figure 5:
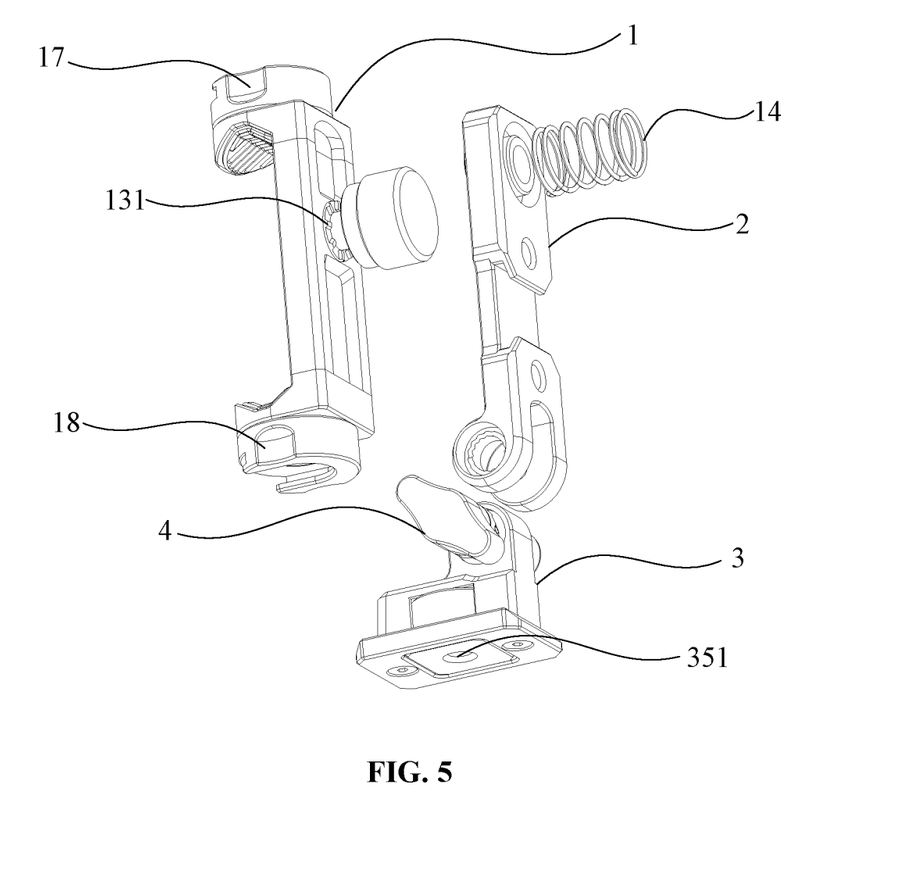
FIG. 5 is an exploded diagram of a multifunctional clamping device according to the present utility model from another angle.

Further, as shown in FIGS. 2 and 5, a plurality of first protrusions 131 are arranged on an outer wall that is of the clamping arm 13 and that is close to the connecting member 2, a plurality of second protrusions 22 are arranged on an outer wall at a position that is of the connecting member 2 and that corresponds to the first protrusion 131, and the first protrusion 131 is rotatably connected to the second protrusion 22. When the clamping arm 13 rotates relative to the connecting member 2, the groove between two adjacent first protrusions 131 is buckled to the second protrusion 22, so that the clamping arm 13 is fixed at a corresponding position of the connecting member 2, and the connection stability between the clamping arm 13 and the connecting member 2 is further improved.

Referring to FIG. 1, a first foot pad 15 and a second foot pad 16 are respectively arranged at two ends of the clamping arm 13. Specifically, in this embodiment, the ends of the first foot pad 15 and the second foot pad 16 are bent inwards, so that the mobile phone can be better clamped; the silica gel pad is also pasted on the clamping arm 13, so that the mobile phone can be prevented from falling off, and the stability of clamping the mobile phone by the clamping assembly 1 is improved; in addition, a maximum distance between the two ends of the clamping arm 13 is 9.5 cm, and the clamping arm is made of all aluminum alloy, so that the clamping arm has the effects of firmness, durability and stability.

Figure 3:
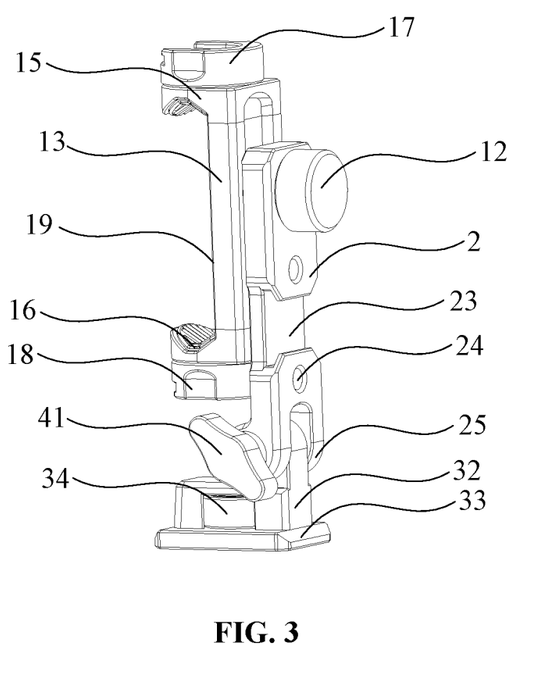
FIG. 3 is a schematic diagram of a structure of a multifunctional clamping device according to the present utility model from another angle.

In order to meet more use requirements of a user, referring to FIG. 3, a first cold shoe opening 17 and a second cold shoe opening 18 are respectively arranged at outer sides of the first foot pad 15 and the second foot pad 16, and the second clamping opening 23 and a plurality of expansion holes 24 are arranged at one side that is of the connecting member 2 and that is far away from the clamping assembly 1. The first cold shoe opening 17 and the second cold shoe opening 18 can be provided with additional LED lights, microphones or other photographing devices, the second clamping opening 23 can also be configured as a cold shoe opening, and the design of the second clamping opening 23 solves the problem that a wireless microphone cannot be fixed during mobile phone recording; and the expansion hole 24 is configured as a hole-shaped structure with threads inside, so that other devices that are required to be mounted can be conveniently expanded.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A multifunctional clamping device, comprising
   a clamping assembly,
   a connecting member and
   a base, wherein
   the clamping assembly is rotatably connected to one end of the connecting member, an other end of the connecting member is rotatably connected to the base through a fixing assembly, the clamping assembly is provided with a first clamping opening used to clamp an object, one side of the connecting member away from the clamping assembly is provided with a second clamping opening, the fixing assembly comprises a fixing member, the fixing member is provided with a first toothed disc and a second toothed disc, and the connecting member and the base are respectively provided with first concave teeth and second concave teeth corresponding to the first toothed disc and the second toothed disc;
   wherein a bottom of the connecting member is provided with two connecting arms, a top of the base is clamped between the two connecting arms, the fixing assembly further comprises a first knob and a first fastener, and the first fastener passes through the two connecting arms, the base and the fixing member and is connected to the first knob.

2. The multifunctional clamping device according to claim 1, wherein one of the two connecting arms is provided with a limiting hole used to limit the fixing member, an annular boss is provided in the limiting hole, the fixing member abuts against the annular boss, and the first concave teeth are arranged on the annular boss.

3. The multifunctional clamping device according to claim 2, wherein the fixing member comprises a first cylinder and a second cylinder, the first cylinder has a diameter adapted to a diameter of the limiting hole, the second cylinder has a diameter adapted to an inner diameter of the annular boss, the first cylinder abuts against the annular boss, and the first toothed disc is arranged on the first cylinder.

4. The multifunctional clamping device according to claim 3, wherein the second toothed disc is arranged on the second cylinder, the second concave teeth are arranged on the base, and the second cylinder passes through the inside of the annular boss and is engaged with the base.

5. The multifunctional clamping device according to claim 1, wherein the clamping assembly comprises a second fastener, a second knob and a clamping arm, the second fastener sequentially passes through the clamping arm and the connecting member and is connected to the second knob, and an elastic element is arranged between the second knob and the connecting member.

6. The multifunctional clamping device according to claim 5, wherein a plurality of first protrusions are arranged on an outer wall that is of the clamping arm and that is close to the connecting member, a plurality of second protrusions are arranged on an outer wall at a position that is of the connecting member and that corresponds to the first protrusion, and the first protrusion is rotatably connected to the second protrusion.

7. The multifunctional clamping device according to claim 5, wherein a first foot pad and a second foot pad are respectively arranged at two ends of the clamping arm, a first cold shoe opening and a second cold shoe opening are respectively arranged at outer sides of the first foot pad and the second foot pad, and a plurality of expansion holes are arranged at one side that is of the connecting member and that is far away from the clamping assembly.

8. A multifunctional clamping device, comprising
   a clamping assembly,
   a connecting member and
   a base, wherein
   the clamping assembly is rotatably connected to one end of the connecting member, an other end of the connecting member is rotatably connected to the base through a fixing assembly, the clamping assembly is provided with a first clamping opening used to clamp an object, one side of the connecting member away from the clamping assembly is provided with a second clamping opening, the fixing assembly comprises a fixing member, the fixing member is provided with a first toothed disc and a second toothed disc, and the connecting member and the base are respectively provided with first concave teeth and second concave teeth corresponding to the first toothed disc and the second toothed disc;
   wherein the base comprises a fixed seat, a fixed plate, a rotary disc and a cold shoe seat, two ends of the fixed seat are respectively connected to the connecting member and the fixed plate, the rotary disc is arranged in the fixed seat, the cold shoe seat is arranged at a bottom of the fixed plate, and the cold shoe seat passes through the fixed plate and is in threaded connection with the rotary disc.

9. The multifunctional clamping device according to claim 8, wherein a bottom of the cold shoe seat is provided with a threaded hole used to connect to other devices.

* * * * *